United States Patent [19]
Dauvergne

[11] Patent Number: 5,299,631
[45] Date of Patent: Apr. 5, 1994

[54] HEATING AND VENTILATING APPARATUS FOR THE CABIN OF A MOTOR VEHICLE HAVING A LOW HEAT LOSS MOTOR

[75] Inventor: Jean Dauvergne, Posses, France

[73] Assignee: Valeo Thermique Habitacle, Le Mesnil-Saint-Denis, France

[21] Appl. No.: 9,814

[22] Filed: Jan. 27, 1993

[30] Foreign Application Priority Data

Jan. 31, 1992 [FR] France .................. 92 01107

[51] Int. Cl.$^5$ ............................................. F25B 29/00
[52] U.S. Cl. ................................... 165/29; 237/12.3 B
[58] Field of Search .............. 165/29; 237/2 B, 12.3 B

[56] References Cited

U.S. PATENT DOCUMENTS

| | | |
|---|---|---|
| 1,737,040 | 11/1929 | Burkeley et al. .......... 165/29 |
| 2,376,659 | 5/1945 | Benn ............................ 165/29 |
| 3,867,979 | 2/1975 | Carrasse et al. ............ 165/29 |
| 4,232,211 | 11/1980 | Hill . |
| 4,815,658 | 3/1989 | Hidemitsu et al. .......... 237/12.3 B |

FOREIGN PATENT DOCUMENTS

| | | | |
|---|---|---|---|
| 0214605 | 3/1987 | European Pat. Off. ....... B60H 1/00 |
| 2451221 | 5/1976 | Fed. Rep. of Germany .......... B60H 1/22 |
| 2214605 | 11/1976 | France .......................... B60H 1/00 |

*Primary Examiner*—A. Michael Chambers
*Attorney, Agent, or Firm*—Morgan & Finnegan

[57] ABSTRACT

A motor vehicle, for example an electric vehicle, of the kind having a propulsion motor with a low heat loss, i.e. which emits heat at a relatively low rate, has a heating and ventilating apparatus for its cabin. The heating and ventilating apparatus comprises: first heating and ventilating means including a first blower feeding air into a first duct through a first heating radiator, through which fluid heated by the propulsion motor flows; second heating and ventilating means including a second blower feeding air into a second duct through a second heating radiator which is powered electrically; a common delivery duct which is fed by the first and second ducts; and control means for selectively distributing the air streams delivered respectively by the first and second ducts into the delivery duct.

11 Claims, 2 Drawing Sheets

HEATING AND VENTILATING APPARATUS FOR THE CABIN OF A MOTOR VEHICLE HAVING A LOW HEAT LOSS MOTOR

FIELD OF THE INVENTION

This invention relates to a heating and ventilating apparatus for the cabin of a motor vehicle of a kind having a motor with low heat loss characteristics. Such vehicles consist in particular (though not exclusively) of so-called electric vehicles which are propelled by an electric motor powered by batteries on board the vehicle itself.

BACKGROUND OF THE INVENTION

Such electric vehicles may be driven by a purely electrical power unit, or they may be driven by a mixed power unit, which consists of an electric motor together with an auxiliary heat engine. The heat engine can either drive a generator for recharging the power batteries (in the case of so-called hybrid vehicles), or it may also serve as a propulsion unit for direct propulsion of the vehicle (in the case of "dual model" vehicles). Such mixed propulsion vehicles are also referred to as "lean and clean" vehicles, due to the fact that the auxiliary heat engine is not intended to be used in urban situations.

The electric propulsion motors of electric vehicles give off only a small amount of heat, generally in an amount of the order of a few hundred watts, as compared with the heat engines of conventional motor vehicles which emit very much more heat.

In conventional motor vehicles, the high heat loss of the engine is used for the purpose of heating the cabin of the vehicle. To this end, a heating radiator is supplied with engine cooling fluid, and an airstream is passed through the radiator and thence delivered into the cabin. By contrast, in an electric vehicle, whether having purely electrical propulsion or mixed propulsion, the heat output emitted by the propulsion unit has up to the present time been regarded as much too small to be useful for heating the cabin. This is why heating of electric vehicles is usually obtained by means of an electric heating radiator or by a fuel burner.

The main disadvantage of an electrical heating radiator is that it is supplied with power from the on-board source of electrical energy, which is detrimental to the autonomy, or independence, of this type of vehicle. Such autonomy is already severely reduced by the limited capacity of the propulsion batteries. As to the use of a fuel burner, the disadvantage of this is that two different energy sources have to be provided on the vehicle, and such a burner is of course also a source of pollution.

DISCUSSION OF THE INVENTION

A main object of the invention is to overcome the drawbacks mentioned above. A particular object of the invention is to provide a heating apparatus for the cabin of a motor vehicle which is most particularly suitable for electric vehicles.

It is also an object of the invention to provide such a heating apparatus in a form which minimises the use of energy while at the same time providing a satisfactory level of comfort, and without involving any pollution.

A further object of the invention is to provide such a heating apparatus which is less detrimental to the autonomy or independence of the vehicle in which it is installed.

To these ends, according to the invention there is provided apparatus for heating and ventilating the cabin of a motor vehicle having a motor with low heat loss, characterised in that it comprises:

first heating and ventilating means comprising a first blower adapted to deliver an air stream into a first duct, through a first heating radiator in which a fluid heated by the motor flows, second heating and ventilating means comprising a second blower, which is adapted to deliver an air stream into a second duct through a second heating radiator which is energised by a source of electric voltage, a delivery duct, fed by the first duct and the second duct and exhausting into the cabin, and control means for selectively distributing the air streams which are delivered into the delivery duct through the first duct and second duct into the outlet duct respectively.

The apparatus of the invention thus makes use of the thermal emissions of the motor which, if they are small, are still by no means negligible. The expression "heat loss", as used in this application in relation to the motor, is to be understood to mean the heat which is given off not only by the electric propulsion motor itself but also by its electronic power control unit. The heat losses which can thus be recovered are completed by the thermal energy which is obtained by means of the second heating radiator, which receives its power from a source of electrical voltage.

In a first embodiment of the invention, the first duct and the second duct of the apparatus are arranged in a parallel configuration. In that case, the first duct is provided with an external port which is open on the outside of the cabin, together with an internal port which is open into the outlet duct, and in that a first distribution valve is provided, which is movable between two extreme positions in which it selectively closes the external port or the internal port, respectively, of the first duct. Thus, when the first distribution valve closes the external port, all the heat losses from the motor are used for heating the cabin. On the other hand, when the first distribution valve closes off the internal port, all of the heat losses are removed outside the vehicle.

In the above mentioned first embodiment of the invention, the second duct is provided with a single port which is open into the common delivery duct, and a second distribution valve is provided, which is movable between two extreme positions in which it selectively opens or closes the port of the second duct.

Preferably, the apparatus includes synchronising means for synchronising the first distribution valve and the second distribution valve with each other, in such a way that: (i) when the said first valve is in the position in which it closes the said internal port, the second distribution valve is in the position in which it closes the single port of the second conduit; (ii) when the first distribution valve is in the position in which it closes the external port, the second distribution valve is able to assume various positions; and (iii) the first distribution valve is able to assume an intermediate position when the second distribution valve is in the position in which it closes the said port of the second duct. It is thus possible to heat the cabin of the motor vehicle, either from the first heating means or from both the first and second heating means together.

In a modification it is even possible, when the vehicle is at rest, to preheat the cabin using the electric second heating radiator, with the latter being connected to the mains.

In a second embodiment of the invention, the first and second conduits are arranged in a series configuration; in this case, the first duct is preferably arranged to deliver an air stream into the second blower, with the second conduit, downstream of the second blower then delivering the air stream to the cabin via the delivery duct. In this way the second blower receives an air stream which has already been preheated in the first heating means, and this air stream can then be further heated if necessary by the second heating radiator.

Preferably, in this second embodiment of the invention, the first duct has at least one external port opening to the outside of the cabin of the vehicle, and at least one valve is provided which is adapted for the selective opening or closing of the said external port. When this valve closes off the external port, all of the air stream delivered by the first blower is passed to the second blower, while when the valve is in its open position, the air stream delivered from the first blower is dumped outside the vehicle.

In accordance with a further preferred feature of the invention, the second heating radiator is an electrical resistance heater having heating resistances with a positive temperature coefficient.

The apparatus of the invention preferably includes means for supplying the second heating radiator with power selectively either from an on-board electrical source or from an external electrical source.

Some preferred embodiments of the invention will be described below, by way of example only and with reference to the accompanying drawings.

DESCRIPTION OF PREFERRED EMBODIMENTS OF THE INVENTION

Figure 1:
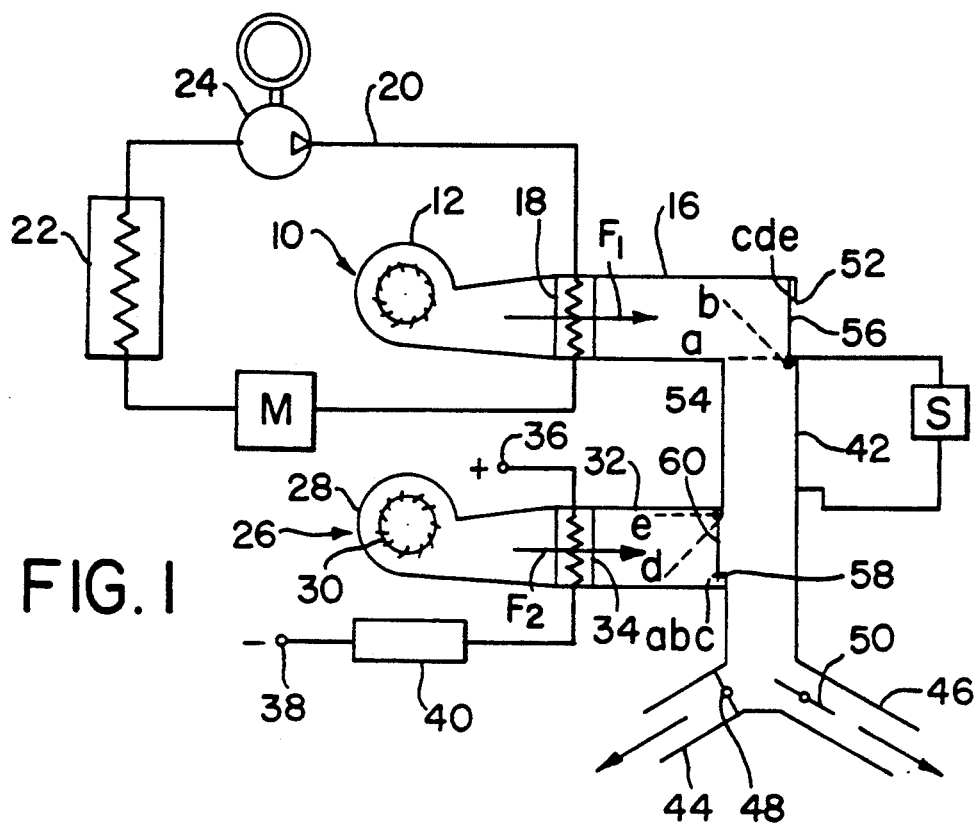
FIG. 1 shows in diagrammatic form one heating and ventilating apparatus in the first embodiment of the invention mentioned above.

The heating and ventilating apparatus shown in FIG. 1 is adapted for installation in a vehicle of the type defined above, and includes an electric motor M of a low heat loss type. The apparatus includes first heating means 10, which essentially comprise a first blower 12 for aspirating outside air into the apparatus and for delivering it through a turbine 14 (see FIG. 2) into a first duct 16, and so through a first heating radiator 18. The direction of flow in the first duct 16 is indicated by the arrow F1.

The radiator 18 is a heat exchanger through which a hot fluid, for example water, is arranged to flow. This fluid acts as a coolant for the motor M and for its electronic control unit (not shown), and it flows in a loop 20, i.e. in closed circuit. The loop 20 also includes a further heat exchanger 22, for cooling the motor M and its electronic control unit, together with a motorised pump 24 which drives the fluid through the closed circuit.

The apparatus also includes second heating and ventilating means 26, which consist essentially of a further blower 28 for drawing air from outside the vehicle and delivering it through a turbine 30 into a second duct 32 and so through a second heating radiator 34. The direction of flow of the fluid through the second duct 32 is indicated by the arrow F2. The second radiator or heater 34 has at least one electrical heating resistance, which is arranged to be connected to the positive pole 36 and the negative pole 38 of a source of electrical voltage, through a regulator 40. This regulator is such as to modify the heating rate of the radiator 34, and also to shut off this radiator and cause the blower 28 to operate in a ventilating mode only during hot weather.

The electrical source that supplies the radiator 34 comprises batteries mounted on the motor vehicle. It is also possible to provide means which supply the radiator 34 from an external electrical source when the vehicle is stationary, for the purpose of preheating the cabin of the vehicle.

In the embodiment shown in FIG. 1, the ducts 16 and 32 are arranged in a parallel configuration, and discharge at their downstream ends into a common delivery duct 42. The delivery duct 42 has in this example two outlet mouths 44 and 46 for delivering air into the cabin of the vehicle. These two outlet mouths are controlled by two distribution valves 48 and 50 respectively.

The first duct 16 has an external port 52 which is open to the outside of the cabin, together with an internal port 54 which is open into the common delivery duct 42. A first distribution valve 56 is arranged to be movable between two extreme positions in which it closes, selectively, the external port 52 or the internal port 54. In FIG. 1, this valve is shown in full lines in its first position as indicated at c, d and e, its other extreme position being indicated in broken lines at a. The valve 56 may also occupy at least one intermediate position such as the position indicated at b in broken lines.

The second duct 32 opens at its downstream end into the common delivery duct 42 through a single port 58, which is controlled by a second distribution valve 60. This second distribution valve is again movable between two extreme positions, namely a closed position indicated in FIG. 1 in full lines at a, b and c, and an open position indicated at e in broken lines. This valve too may be arranged to occupy at least one intermediate position, such as the position d shown in broken lines, between the two extreme positions.

The apparatus shown in FIG. 1 operates in the following way. In warm weather, that is to say when the outside temperature is higher than about 20° C., the first distribution valve 56 closes off the internal port 54 in position a, and the second distribution valve 60 also closes off the port 58 in position a, the electric radiator 34 not being energised. The heat output of the motor M is then dissipated outside the vehicle via the external port 52.

If on the other hand the outside temperature drops so as to reach a value of the order of 15° C., the first distribution valve 56 is moved into an intermediate position (position b), while the second distribution valve 60 remains in its closed position b and the radiator 34 remains unenergised. Accordingly, some of the heat emitted by the motor is conveyed out of the vehicle, while some is transferred into the common delivery duct 42 and from thence into the cabin of the vehicle. If the outside temperature then drops further, to a value of, for example, the order of 10° C., the first distribution valve 56 is closed over the external port 52 in position c, while the other distribution valve 60 remains in its closed position (position c) and the radiator 34 remains unenergised. All the heat output of the motor is then delivered into the cabin via the common delivery duct 42.

In the circumstances just described, the supply of fresh air from outside the vehicle, or ventilation of the cabin, can be obtained by opening the second distribution valve 60 into position e, which opens the port 58. The blower 28 may also be operated at the same time, the radiator 34 remaining shut off.

If now the outside temperature is reduced still further, for example to a value of the order of −5° C., the heat output of the motor is then generally insufficient to provide an adequate level of comfort in the cabin. Accordingly it is necessary to bring into play a supplementary source of heat, and this is done by means of the electric radiator 34. To this end the second distribution valve 60 is moved into an intermediate position (position d), and the regulator 40 is operated to control the heat output of the radiator 34. If the outside temperature should fall to a very low value, such as for example a value of the order of −20° C., the second distribution valve can be fully opened (position e), with the regulator 40 being used to adjust the power output of the radiator 34 to a suitable value. In the case in which the valve 60 is in position d or e, the first distribution valve 56 does of course remain in the position in which it closes off the external port 52, so that all the air delivered by the first blower 12 passes into the common delivery duct 42.

The values of temperature given above, corresponding to the various valve settings, i.e. the positions of the distribution valves 56 and 60 such as a to e, are of course by way of example only. The threshold values of temperature corresponding to the different settings will clearly depend in each case on the vehicle concerned and the behaviour of the motor that drives it.

As illustrated in the drawings, a synchronising means S effects the particular opening and closing of the various distribution control valves in accordance with the changing outside temperature.

Figure 2:
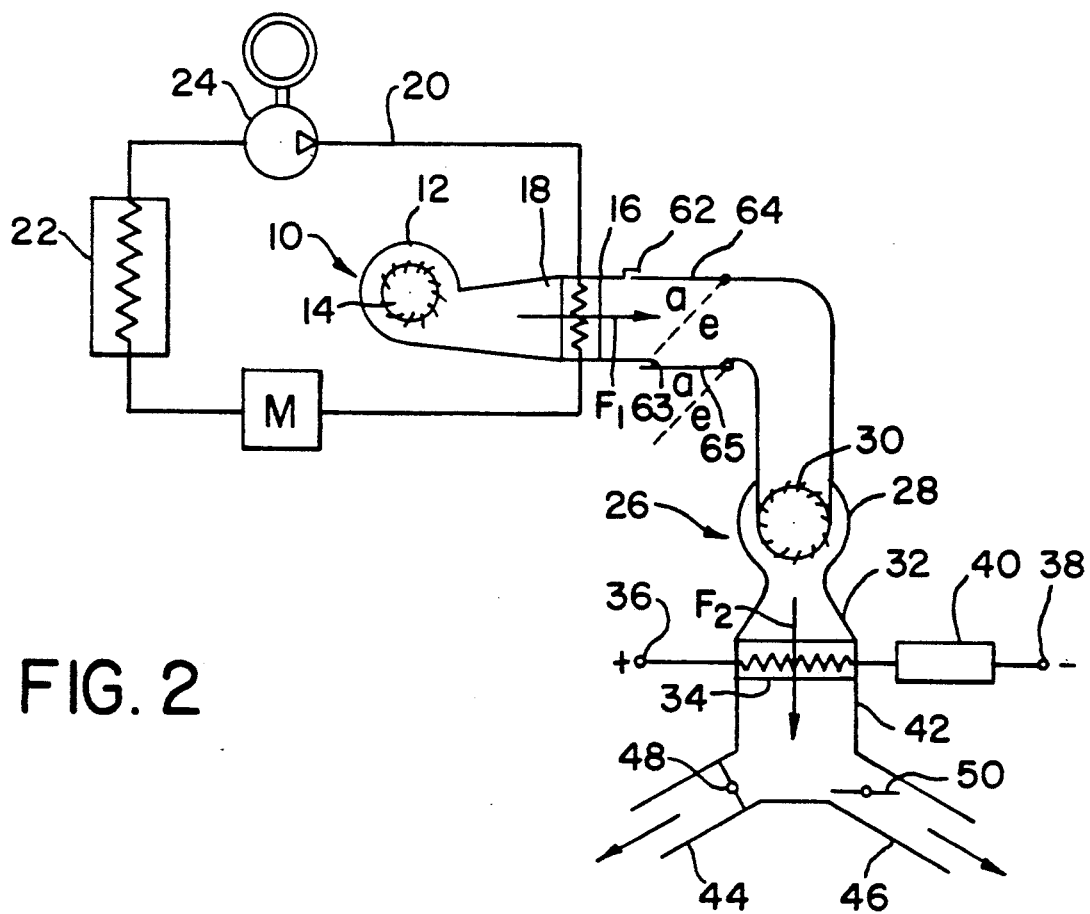
FIG. 2 shows, again in diagrammatic form, another embodiment of the apparatus in accordance with the invention.

Reference is now made to FIG. 2, showing another embodiment of the invention in which the elements common with those shown in FIG. 1 are indicated by the same reference numerals. The apparatus of FIG. 2 differs essentially from that in FIG. 1 in that the ducts 16 and 32 are arranged in series with each other instead of being in parallel.

Thus the first duct 16 is arranged to deliver the air stream from the first blower 12 in the direction of the arrow F1 directly into the second blower 28. The latter then delivers an air stream as indicated by the arrow F2 into the second or output duct 32. The radiator 34 in this embodiment is mounted in this outlet duct 32, with the common delivery duct 42 being a continuation of the duct 32 downstream of the radiator 34.

The first duct 16 is provided with two external ports 62 and 63, both of which are open to the outside of the cabin of the vehicle. In addition, two valves 64 and 65 are associated with these ports 62 and 63 respectively, for selectively opening and closing the ports. In FIG. 2 the valves 64 and 65 are shown in full lines in their closed position at a, and in an open position at e in broken lines. When the valves 64 and 65 are closed, all of the air stream delivered by the blower 12 is passed to the blower 28. By contrast, when the valves 64 and 65 are open (position e in both cases), the air stream delivered by the blower 12 escapes through the port 62 to the outside of the vehicle. The port 63 acts at the same time as a ventilator and/or as an inlet for fresh air from outside.

Thus, when the outside temperature is high enough, the valves 64 and 65 are opened, and the heat emitted by the motor is taken outside the vehicle through the port 62. Ventilation and/or supply of fresh air from outside can then be obtained through the port 63 by operation of the blower 28, the radiator 34 being inoperative. However, when the outside temperature drops, and achieves for example a value of the order of 15° C., the valves 64 and 65 are set to their closed position. The flow of fresh air delivered by the blower 12 is then passed to the blower 28, and from there to the common delivery duct 42. If necessary, the temperature of this warm air can be increased by energising the electric radiator 34, by an amount which can be varied by suitable adjustment of the regulator 40.

In either one of the two embodiments described above, the electric heater 34 is preferably one that has at least one heating resistance with a positive temperature coefficient (PTC). Such heating resistances are those in which resistivity varies very greatly with temperature, by contrast with conventional resistances in which resistivity is almost constant regardless of the temperature. The use of a heating radiator having PTC heating resistances enables the electric power consumed to be adapted to the desired thermal power or heat output, without any need to provide any supplementary control means. A domestic heating apparatus which includes heating resistances of this type is known for example from the specification of published European patent application EP 204393A. Thus the invention enables the heat output of the motor of the vehicle to be used beneficially, and also provides, if necessary, a complementary source of heat via the electric heater or radiator.

As has already been indicated above, it is also possible to preheat the vehicle when the latter is at rest, by energising the electric heater from the mains. The advantage of this is that the cabin can be preheated electrically without extracting any energy from the battery or other electric source mounted in the vehicle. Such preheating may be initiated for example by means of a suitable programmer (not shown).

Figure 3:
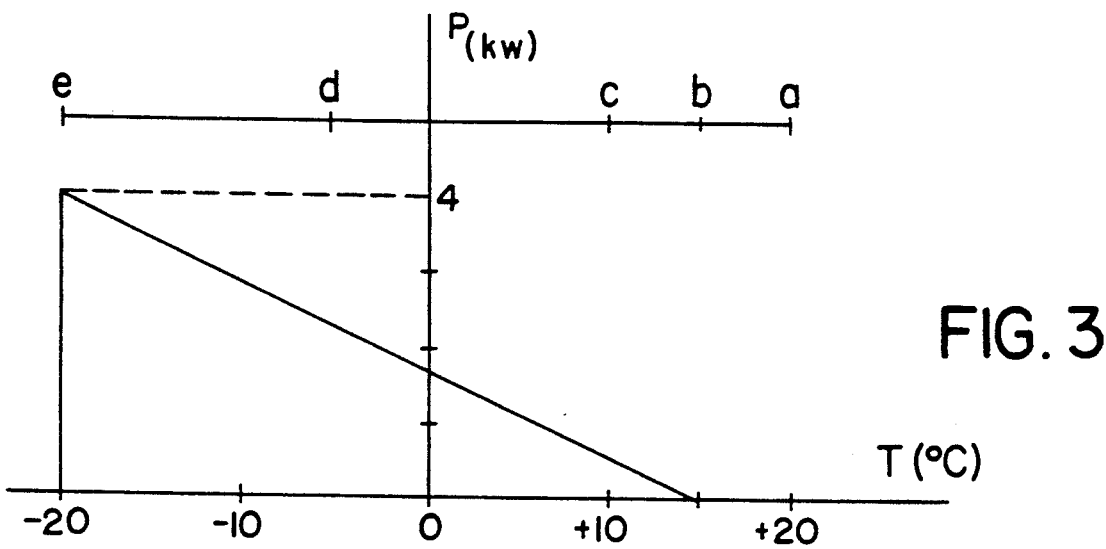
FIG. 3 is a diagram showing the thermal power necessary for heating the cabin of a motor vehicle, as a function of outside temperature.

Reference is now made to FIG. 3, which shows the variations in thermal power or heat output (expressed in kW) which is required in the cabin of a given vehicle, plotted against the outside temperature T expressed in degrees Celsius. In this example, the heat output is 4 kW for an outside temperature of −20° C., and this output then diminishes in a linear manner until it reaches a zero value when the outside temperature is 15° C. FIG. 3 also shows the positions a to e of the valves discussed above. In this particular example, the maximum heat output is 4 kW, and the heat output from the motor M is capable of producing a maximum heat output of 500 W, while the electric heater 34 is capable of giving a maximum heat output of 3500 W.

Figure 4:
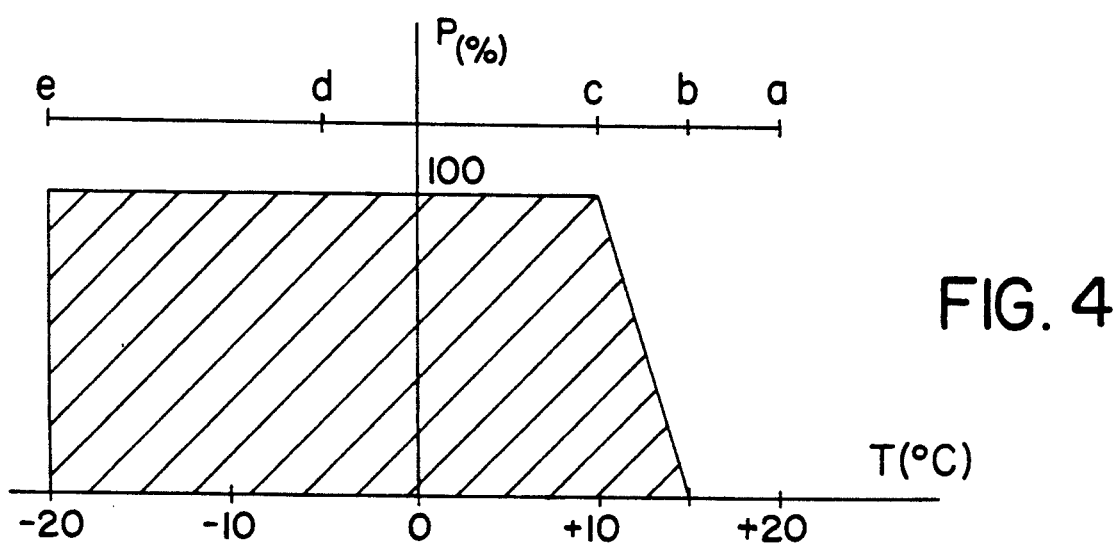
FIG. 4 is a diagram showing the variation of thermal power generated by the first heating means in relation to variation in outside temperature and valve settings.

Referring now to FIG. 4, when the distribution valve 56 closes the external port 52 (i.e. in the position c, d, e), the whole of the heat output of the motor is passed to the cabin, that is to say 100% of the maximum heat output of 500 W. Then, from the instant at which the valve 56 is moved away from its position c so as to begin to open the port 52, towards the position in which the other port 54 is closed (position a), the heat passed towards the cabin diminishes progressively and in a linear manner. When the valve 56 is in its position a, corresponding to an outside temperature of the order of 15° C., the cabin then receives no heat from the motor, all of this heat being expelled to the outside.

Figure 5:
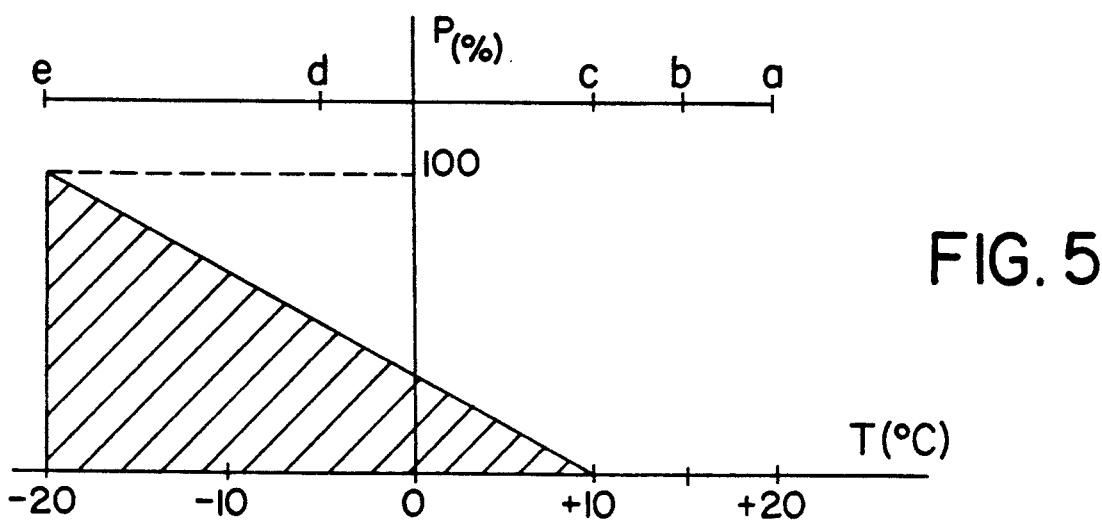
FIG. 5 is another diagram which shows the variation in thermal power generated by the second heating means of the apparatus shown in FIG. 1, in relation to variation in the outside temperature and valve settings.

As is shown in FIG. 5, to which reference is now made, the electric heater 34 gives a maximum power output, that is to say 100% of 3500 W, when the distribution valve 60 is in its fully open position (position e). This heat output diminishes in a linear manner as the valve is adjusted towards its closed position (position c). In the example shown, when the temperature exceeds 10° C. the electric heater 34 is no longer energised.

The heating and ventilating apparatus of the invention thus enables adequate heating for the cabin of an electric vehicle to be obtained while obtaining the maximum economy in the energy stored on the vehicle, and without in any way compromising the autonomy of the latter.

What is claimed is:

1. Heating and ventilating apparatus for the cabin of a motor vehicle having a low heat loss motor, wherein said apparatus comprises: delivery duct for delivering air into the cabin of the vehicle; first heating and ventilating means connected with said delivery duct; and second heating and ventilating means connected with said delivery duct, the first heating and ventilating means comprising: a first duct connected with the delivery duct; a first blower connected with said first duct for delivering an air stream into said first duct; an first heating radiator disposed between the first blower and said first duct; and means connecting the first heating radiator in a fluid circuit so that the first radiator can receive a fluid heated by the motor of the vehicle, the second heating an ventilating means comprising: a second duct connected with the delivery duct; a second blower connected with the second duct for delivery of an air stream to the second duct; an electrical second heating radiator arranged between the second blower and said second duct; and mean for connecting said second radiator electrically with a voltage source, the apparatus further including control means for selectively distributing the air streams delivered respectively through the first and second ducts to the delivery duct.

2. Apparatus according to claim 1, wherein the said first and second ducts are arranged in parallel.

3. Apparatus according to claim 2, wherein said first duct defines an external port open to the outside of the cabin, together with an internal port open towards said delivery duct, said control means including a first distribution valve associated with said external and internal ports for selectively opening and closing said external and internal ports.

4. Apparatus according to claim 2, wherein said second duct defines a single port open into said delivery duct, said control means including a second distribution valve associated with the port of the second duct and displaceable between two extreme positions in which it respectively closes an opens said port defined by the second duct.

5. Apparatus according to claim 3, wherein said second duct defines a single port open into said delivery duct, said control means further including a second distribution valve associated with the port of the second duct and displaceable between two extreme positions in which it respectively closes and opens said port of the second duct, and means for synchronising said first and second distribution valves, whereby: when the internal port is closed by the first distribution valve, the single port of the second duct is closed by the second distribution valve; when the external port is closed by the first distribution valve, the second distribution valve is able to assume various positions; and when the said port of the second duct is closed by the second distribution valve, the first distribution valve is able to assume an intermediate position.

6. Apparatus according to claim 3, wherein said second duct defines a single port open into said delivery duct, said control means further including a second distribution valve associated with the port of the second duct and displaceable between two extreme positions in which it respectively closes and opens said port of the second duct, and means for synchonising said first and second distribution valves, whereby, when one of the ports comprising said internal and external ports is closed by the first distribution valve, the second distribution valve is able to assume various positions, and when the first distribution valve is in an intermediate position, the second distribution valve is able to assume various positions.

7. Apparatus according to claim 1, wherein said first and second ducts are arranged in series.

8. Apparatus according to claim 7, wherein said second blower is arranged downstream of the first duct so as to receive an air stream from the first duct, the second duct being connected downstream of the second blower and upstream of said delivery duct.

9. Apparatus according to claim 8, wherein said first duct defines at least one external port open to the outside of the cabin, said control means comprising at least one valve for selectively opening or closing said at least one external port of the first duct.

10. Apparatus according to claim 1, wherein said second heating radiator is an electrical resistance radiator having a positive temperature coefficient.

11. Apparatus according to claim 1, wherein the electrical connecting mean for said second heating radiator comprises means for selectively connecting the radiator to an on-board electrical source or a fixed electrical source.

* * * * *